US011038358B2

(12) United States Patent
Lo et al.

(10) Patent No.: US 11,038,358 B2
(45) Date of Patent: Jun. 15, 2021

(54) CHARGER CIRCUIT WITH BATTERY PROTECTION MECHANISM

(71) Applicant: MEDIATEK INC., Hsin-Chu (TW)

(72) Inventors: Kuo-Chang Lo, Taipei (TW); Chia-Hsiang Lin, Taipei (TW); Chih-Chien Huang, Hsinchu (TW)

(73) Assignee: MediaTek Inc., Hsin-Chu (TW)

( * ) Notice: Subject to any disclaimer, the term of this patent is extended or adjusted under 35 U.S.C. 154(b) by 478 days.

(21) Appl. No.: 15/172,165

(22) Filed: Jun. 3, 2016

(65) Prior Publication Data
US 2017/0288427 A1 Oct. 5, 2017

Related U.S. Application Data

(60) Provisional application No. 62/316,582, filed on Apr. 1, 2016.

(51) Int. Cl.
*H02J 7/00* (2006.01)

(52) U.S. Cl.
CPC ............ *H02J 7/0026* (2013.01); *H02J 7/007* (2013.01); *H02J 7/0031* (2013.01);
(Continued)

(58) Field of Classification Search
CPC ........ H02J 7/004; H02J 7/0026; H02J 7/0031; H02J 7/0045; H02J 7/007; H02J 7/0091; H02J 7/00036; H02J 7/00302; H02J 7/00047; H02J 7/00309; H02J 7/00308; H02J 7/0036; H02H 7/18
(Continued)

(56) References Cited

U.S. PATENT DOCUMENTS 5,896,025 A * 4/1999 Yamaguchi ........... H02J 7/0031
320/134
6,160,381 A 12/2000 Peterzell
(Continued)

FOREIGN PATENT DOCUMENTS

CN 202602326 U 12/2012
CN 203166483 U 8/2013
(Continued)

OTHER PUBLICATIONS

Extended European Search Report for European Application No. 16207239.1 dated Jul. 27, 2017.

*Primary Examiner* — Richard Isla
*Assistant Examiner* — Johali A Torres Ruiz
(74) *Attorney, Agent, or Firm* — Wolf, Greenfield & Sacks, P.C.

(57) ABSTRACT

A charger circuit for use in controlling charge of a battery pack, which includes a charge control switch and a control unit. The charger circuit has at least one power output terminal and one connection terminal for coupling the battery pack. The charge control switch is arranged to selectively provide a power from a power source to the battery pack through the power output terminal. The control unit is coupled to the charge control switch and the connection terminal, and determines whether to turn off the charge control switch according to a signal based on the connection terminal, wherein the signal based on the connection terminal indicates at least one of an over-voltage condition and an over-temperature condition.

11 Claims, 1 Drawing Sheet

(52) U.S. Cl.
CPC ........ *H02J 7/00036* (2020.01); *H02J 7/0045* (2013.01); *H02J 7/0091* (2013.01); *H02J 7/00302* (2020.01)

(58) Field of Classification Search
USPC .......................................................... 320/112
See application file for complete search history.

(56) References Cited

U.S. PATENT DOCUMENTS

| | | | |
|---|---|---|---|
| 2001/0017531 A1 | 8/2001 | Sakakibara | |
| 2003/0030413 A1 | 2/2003 | Saeki et al. | |
| 2003/0178968 A1* | 9/2003 | Sakakibara | H02J 7/0069 320/110 |
| 2005/0077878 A1* | 4/2005 | Carrier | H01M 2/34 320/134 |
| 2008/0054852 A1* | 3/2008 | Kazuta | H02J 7/0031 320/137 |
| 2009/0212736 A1* | 8/2009 | Baarman | H02J 7/025 320/106 |
| 2011/0074339 A1* | 3/2011 | Midorikawa | G06F 1/263 320/106 |
| 2013/0111251 A1* | 5/2013 | Leinonen | G06F 11/3058 713/340 |
| 2014/0035360 A1* | 2/2014 | Butzmann | H01M 10/441 307/10.1 |
| 2016/0097820 A1* | 4/2016 | Thompson | G01R 31/374 320/134 |
| 2017/0268449 A1* | 9/2017 | Nagata | F02D 41/221 |

FOREIGN PATENT DOCUMENTS

| | | |
|---|---|---|
| CN | 104426143 A | 3/2015 |
| EP | 1 128 517 A2 | 8/2001 |
| EP | 1 291 999 A1 | 3/2003 |
| TW | 200630630 | 9/2006 |
| TW | 200929795 | 7/2009 |
| TW | 201221318 A1 | 6/2012 |

* cited by examiner

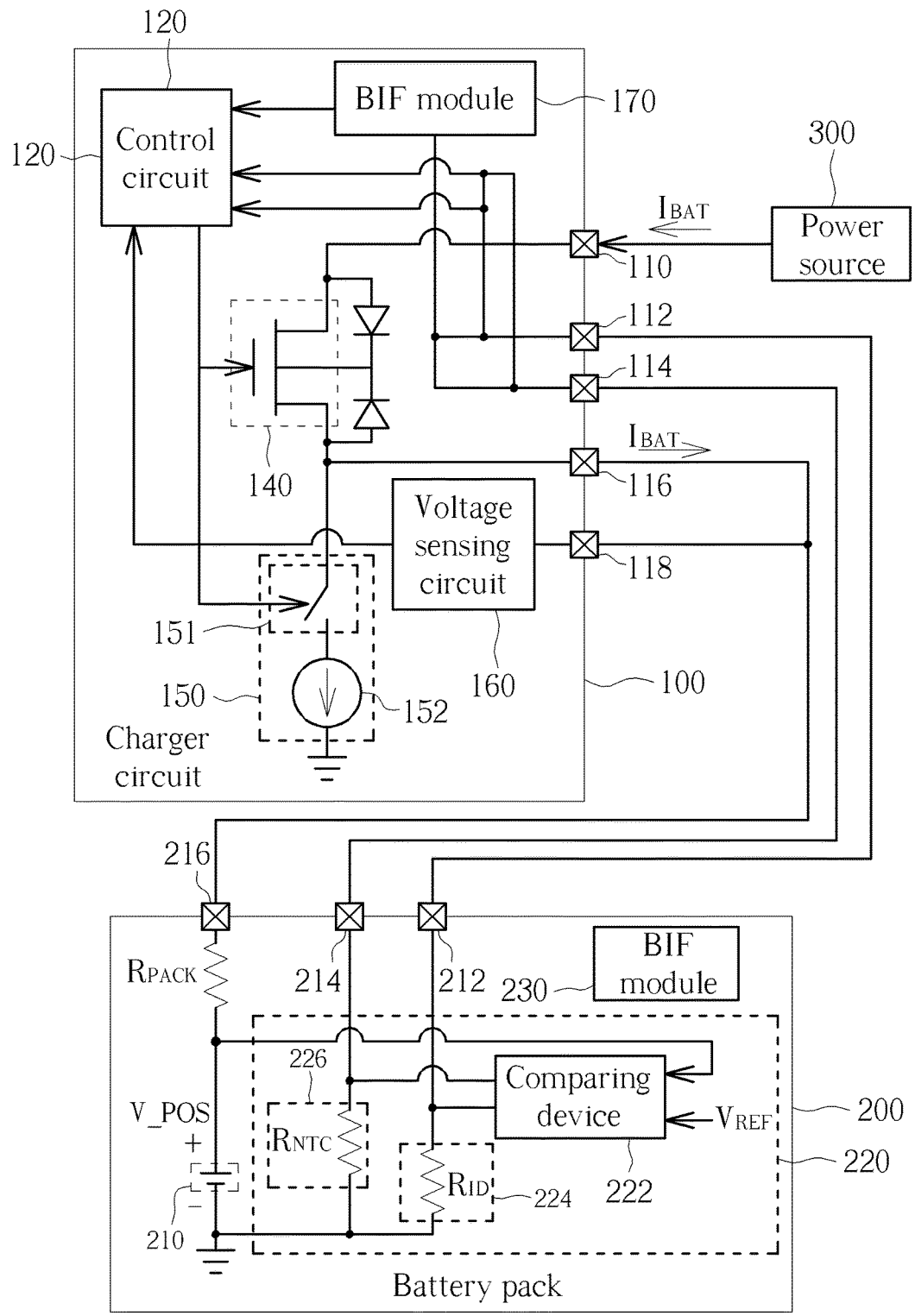

CHARGER CIRCUIT WITH BATTERY PROTECTION MECHANISM

CROSS REFERENCE TO RELATED APPLICATIONS

This application claims the benefit of U.S. Provisional Application No. 62/316,582, filed on Apr. 1, 2016. The entire contents of the related applications are incorporated herein by reference.

BACKGROUND

The present invention relates generally to battery protection, and more particularly, to a charger circuit and a power system that have over-voltage and over-temperature protection mechanism for a battery pack.

Over-temperature, over-current or over-voltage errors of a battery pack, such as a Li-ion and Li-Polymer battery pack, may occur when an electronic device that is powered by the battery pack performs a charging/discharging operation on it. To prevent such errors from causing damage, the battery pack usually has a built-in protection circuit, which is able to detect the above-mentioned errors and cutting off the charging/discharging current once the temperature of the battery pack, charging/discharging current to/from a battery cell of the battery pack, and/or the voltage level of the battery cell exceeds safe limits. However, such protection mechanism only resides at the battery side, and does not reside at the system side (i.e., a charger circuit for controlling the charge of the battery pack). Hence, when over-temperature, over-current or over-voltage errors occurs during charging period but the protection circuit in the battery pack has malfunctioned, power supplied by the charger circuit may continue the charge of the battery cell, which eventually causes unrecoverable and severely damages to ruin the battery pack, or even exploding the battery back.

SUMMARY

To address the above-mentioned problems, it is one object of the present invention to provide a charger circuit and a power system that have battery protection mechanism, which is capable of stopping a charging operation on a battery and also providing a discharging path for discharging the battery upon detecting an over-voltage/over-temperature condition.

According to one embodiment of the present invention, a charger circuit for use in controlling charge of a battery pack is provided. The charger circuit has at least one power output terminal and one connection terminal for coupling the battery pack and includes a charge control switch, and a control unit. The charge control switch is arranged to selectively provide a power from a power source to the battery pack through the power output terminal. The control unit is coupled to the charge control switch and the connection terminal, and determines whether to turn off the charge control switch according to a signal based on the connection terminal, wherein the signal based on the connection terminal indicates at least one of an over-voltage condition and an over-temperature condition.

According to one embodiment of the present invention, a power system is provided. The power system comprises a charger circuit and a battery pack including a battery cell. The charger circuit has at least one power output terminal and one connection terminal for coupling the battery pack. Additionally, the charger circuit comprises a charge control switch and a control unit. The charge control switch is arranged to selectively provide a power from a power source to the battery pack through the power output terminal. The control unit is coupled to the charge control switch and connection terminal, and arranged to determine whether to turn off the charge control switch according to a signal on the connection terminal, wherein the signal based on the connection terminal indicates at least one of an over-voltage condition and an over-temperature condition.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGURE illustrates a schematic diagram of a charger circuit with battery protection mechanism and a battery pack according to one embodiment of the present invention.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in function. In the following discussion and in the claims, the terms "include", "including", "comprise", and comprising are used in an open-ended fashion, and thus should be interpreted to mean "including, but not limited to . . . ." The terms "couple" and "coupled" are intended to mean either an indirect or a direct electrical connection. Thus, if a first device couples to a second device, that connection may be through a direct electrical connection, or through an indirect electrical connection via other devices and connections.

FIGURE illustrates a schematic diagram of a charger circuit with protection mechanism and a battery pack according to one embodiment of the present invention. As illustrated, a charger circuit 100 has a power input terminal 110, a battery identification terminal 112, a battery temperature terminal 114, a power output terminal 116, and a battery sensing terminal 118, which are generally physical pins. The charger circuit 100 connects to a battery pack 200 through these terminals. The battery identification terminal 112 is coupled to a battery identification contact 212 of the battery pack 200 through at least one electrical conductor. The battery temperature terminal 114 is coupled to a battery temperature contact 214 of the battery pack 200 through at least one electrical conductor. The power output terminal 116 and a battery sensing terminal 118 are coupled to a battery power contact 216 of the battery pack 200 through at least one electrical conductor. Additionally, the charger circuit 100 may also communicate with the battery pack 200 via a Mobile Industry Processor Interface (MIPI) battery interface (BIF) formed by one of the battery identification terminal 112 and the battery temperature terminal 114 to monitor electrical characteristics of a battery cell 210 in the battery pack 200. For example, a signal channel between the battery identification terminal 112 of the charger circuit 110 and the battery identification contact 212 can function as a battery communication line (BCL) of the MIPI. Alternatively, a signal channel between the battery temperature terminal 114 of the charger circuit 110 and the battery temperature 214 can function as a BCL of the MIPI.

The protection mechanism provided by the charger circuit 100 is intended to stop the charge of the battery cell 210 and selectively provide a discharging path to conduct the discharge of the battery cell 210 based on over-voltage detection and/or over-temperature detection such that the battery cell 210 can be protected in an over-voltage condition and/or an over-temperature condition. Typically, the charger circuit 100 uses a charge control switch 140 (which is preferably a power MOSFET illustrated by FIGURE) to selectively provide electrical power (e.g., the current $I_{BAT}$) from a power source 300 to the battery cell 210 through the power output terminal 116 and the battery power contact 216 such that the battery cell 210 can be charged in a constant current or constant voltage mode. In the present invention, once a control unit 120 detects that the battery cell 210 is in the over-voltage condition or the battery cell 210/battery pack 200 is in the over-temperature condition, the control unit 120 will turn off the charge control switch 140 to stop the charge of the battery pack 200 or do not start the charge of the battery pack 200 (if the battery pack 200 is currently being discharged). Further, the control unit 120 can also (but not necessarily couple a discharging circuit 150 to the power output terminal 116 to provide the discharging path for discharging the battery cell 210.

In the embodiments of the present invention, there are several approaches to perform the over-voltage detection. The control unit 120 may monitor a voltage level on the battery identification terminal 112. If the voltage level on the battery identification terminal 112 matches a predefined level transition pattern, such as a transition from a high level to a low level, or a transition from a low level to a high level, the control unit 120 determines the battery cell 210 is in over-voltage condition. In the case, the batter pack 200 comprises a detection circuit 220. The detection circuit 220 comprises a comparing device 222 and a resistive circuit 224. The comparing device 222 has two input terminals, one of which is connected to a positive electrode of the battery cell 210, while the other is connected to a reference voltage level $V_{REF}$. Once the comparing device 222 detects a voltage level V_POS at the positive electrode V_POS is higher than the reference voltage level $V_{REF}$, it can output a driving current to pass through the resistive circuit 224, thereby pulling down/or pulling up the voltage level on the battery identification terminal 112 and the battery identification contact 212 to a certain level, so as to generate an over-voltage detection signal. As a result, the control unit 120 can be aware of the over-voltage condition, and can accordingly the charge control switch 140 to turn off, and further controls the discharging circuit 150 to couple to the power output terminal 116, thereby discharging the battery cell 210. The resistive circuit 224 could be preferably implemented with an identification resistor $R_{ID}$ of the battery pack 200, which is generally used for facilitating identification of type and electrical characteristics of the battery pack 200. To make the control unit 120 differentiate an identification signal (for representing the type and electrical characteristics of the battery pack 200 when not being in the over-voltage condition) from an over-voltage detection signal, the comparing device 222 could be designed to provide the driving current for realizing the predefined level transition pattern that is different from the pattern of the identification signal. For example, if the identification signal is at 1V, the over-voltage detection signal could be at 2V.

Alternatively, the comparing device 222 and the resistive circuit 226 could also generate the over-voltage detection signal. Similarly, when the comparing device 222 detects the voltage level V_POS at the positive electrode of the battery cell 210 is higher than the reference voltage level $V_{REF}$, it outputs the driving current to pass through the resistive circuit 226, thereby pulling down or pulling up the voltage level on the battery temperature terminal 114 and the battery temperature contact 214, thereby generating the over-voltage detection signal. The resistive circuit 226 could be a negative temperature coefficient (NTC) thermistor $R_{NTC}$ of the battery pack 200, which is generally used to sense the temperature in the inside of the battery pack 200. Typically, when the temperature in the inside of the battery pack 200 exceeds safe limits, the resistive circuit 226 is able to pull down the voltage level on the battery temperature terminal 114 and the battery temperature contact 214 to generate an over-temperature detection signal. Hence, through the signal on the battery temperature terminal 114, the control unit 120 could stop charging and accordingly provide the discharging path to the battery pack 200 when one of the over-voltage condition and the over-temperature condition occurs.

If the battery pack 200 is a smart battery, and supports digital data communication protocol, such as MIPI BIF. Then, one of the battery identification terminal 112 and the battery temperature terminal 114 could be served as a battery communication line (BCL) of MIPI BIF. In this case, a BIF module 170 of the charger circuit 100 could communicate with the BIF module 230 of the battery pack 200 through the BCL, to obtain information provided by the BIF module 230 of the battery pack. The BIF module 230 is able to derive electrical characteristics of the battery pack 200, such as a voltage level at the positive electrode and/or a temperature of the battery cell 210. The control unit 120 could obtain information about the voltage level at the positive electrode and/or the temperature of the battery cell 210 through the BIL module 170, and determines whether to turn off the charge control switch 120 to stop the charge of the battery pack 200 and whether to control the discharging circuit 150 to couple to the power output terminal 116 for discharging battery pack 200.

Additionally, the charger circuit 100 may also comprise a voltage sensing circuit 160 that is coupled to the battery sensing terminal 118 and can also detect the over-voltage condition. As the battery sensing terminal 118 is coupled to the battery power contact 216 of the battery pack 200, and the battery power contact 216 is further coupled to a positive electrode of the battery cell 210 through the resistor $R_{PACK}$, the over-voltage condition can be detected by measuring a voltage level at the battery power contact 216. Once the control unit 120 is aware that the voltage level measured at the battery power contact 216 is higher than a predefined threshold (e.g. the reference voltage level $V_{REF}$), the control unit 120 turns off the charge control switch 120 and controls the discharging circuit 150 to couple to the power output terminal 116 for discharging.

In one embodiment, the discharging circuit 150 may selectively be coupled to the power output terminal 116. The discharging circuit 150 may comprise a switch 151 and a current source 152 to provide a sink current in a direction to a low voltage level (e.g. a ground level), thereby discharging the battery cell 210 of the battery pack 200 when it is coupled to the power output terminal. In the embodiment illustrated in FIGURE, one terminal of the current source 152 is connected to a ground, while the other terminal is coupled to the power output terminal 116 through a the switch 151 controlled by the control unit 120. However, the illustrated embodiment is not intended to limit the present invention in scope. According to various embodiments of the present invention, the discharging circuit 150 could be implemented with different architecture.

In conclusion, the present invention provides a battery protection mechanism residing in the charger circuit/system side for prevent against the damage caused by over-voltage and/or over-temperature conditions of the battery pack. An important advantage of the present invention is that the battery protection mechanism is still valid even if the protection circuit in the battery pack has malfunctioned. As a result, the safety of battery use can be fully guaranteed.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A charger circuit for charging a battery pack, comprising:
    at least one power output terminal and at least two connection terminals for coupling to the battery pack;
    a charge control switch, arranged to selectively provide power from a power source to the battery pack through the at least one power output terminal;
    a control unit, coupled to the charge control switch and the at least two connection terminals, arranged to determine whether to turn off the charge control switch according to a signal from the battery pack on one of the at least two connection terminals; and
    a discharging circuit, selectively coupled to the at least one power output terminal, and arranged to discharge a battery cell of the battery pack when the discharging circuit is coupled to the at least one power output terminal,
    wherein the control unit is further coupled to the discharging circuit and arranged to determine whether to control the discharging circuit to couple to the at least one power output terminal according to the signal from the battery pack on one of the at least two connection terminals,
    wherein the signal from the battery pack on one of the at least two connection terminals indicates at least one of an over-voltage condition and an over-temperature condition,
    wherein the signal from the battery pack indicating the over-voltage condition is supplied to a different one of the at least two connection terminals than the signal from the battery pack indicating the over-temperature condition,
    wherein the discharging circuit comprises a switch that is controlled by the control unit and a current source that is connected to a reference level, and when the discharging circuit is coupled to the at least one power output terminal through the switch, the discharging circuit provides a current path from the battery cell through the at least one power output terminal to the reference level, and
    wherein one of the at least two connection terminals is coupled to a battery temperature contact of the battery pack, and the battery pack has a detection circuit that is arranged to generate an over-temperature detection signal at the battery temperature contact by detecting whether a temperature in the battery pack is higher than a predetermined value, and the control unit turns off the charge control switch and controls the discharging circuit to couple to the at least one power output terminal if the over-temperature detection signal indicates the over-temperature condition.

2. The charger circuit of claim 1, wherein one of the at least two connection terminals is coupled to a battery power contact of the battery pack and the charger circuit further comprises a voltage sensing circuit arranged to measure a voltage level on the battery power contact to generate an over-voltage detection signal, and the control unit turns off the charge control switch and controls the discharging circuit to couple to the at least one power output terminal if the over-voltage detection signal indicates the over-voltage condition.

3. The charger circuit of claim 1, wherein one of the at least two connection terminals is coupled to a battery identification contact of the battery pack, and the battery pack has a detection circuit that is arranged to generate an over-voltage detection signal at the battery identification contact by detecting whether a voltage level of a positive electrode of the battery cell is higher than a predetermined reference voltage level, and the control unit turns off the charge control switch and controls the discharging circuit to couple to the at least one power output terminal if the over-voltage detection signal indicates the over-voltage condition.

4. The charger circuit of claim 1, wherein one of the at least two connection terminals is coupled to a battery temperature contact of the battery pack, and the battery pack has a detection circuit that is arranged to generate an over-voltage detection signal at the battery temperature contact by detecting whether a voltage level of a positive electrode of the battery cell is higher than a predetermined reference voltage level, and the control unit turns off the charge control switch and controls the discharging circuit to couple to the at least one power output terminal if the over-voltage detection signal indicates the over-voltage condition.

5. The charger circuit of claim 1, wherein the at least two connection terminals are arranged to function as a battery communication line (BCL) of Mobile Industry Processor Interface (MIPI) battery interface (BIF), and the charger circuit further comprises a BIF module, the control unit obtains information regarding a voltage level or a temperature of the battery cell from a BIF module of the battery pack, the control unit determines to turn off the charge control switch and control the discharging circuit to couple to the at least one power output terminal if the information from the BIF module of the battery pack indicates the over-voltage or the over-temperature condition;
    wherein the BIF module of the charger circuit is coupled to the BIF module of the battery pack through a BCL.

6. A power system with a battery protection mechanism, comprising:
    a battery pack including a battery cell; and
    a charger circuit, comprising:

at least one power output terminal and at least two connection terminals for coupling to the battery pack;

a charge control switch, arranged to selectively provide power from a power source to the battery pack through the at least one power output terminal;

a control unit, coupled to the charge control switch and the at least two connection terminals, arranged to determine whether to turn off the charge control switch according to a signal from the battery pack on one of the at least two connection terminals;

a discharging circuit, selectively coupled to the at least one power output terminal, and arranged to discharge the battery cell of the battery pack when the discharging circuit is coupled to the at least one power output terminal;

a comparing device, having a first input terminal and a second input terminal, the first input terminal being coupled to a positive electrode of the battery cell and the second input terminal being coupled to a reference voltage level, the comparing device arranged to compare a voltage level on the positive electrode of the battery cell with the reference voltage level and generate a driving current when the voltage level on the positive electrode of the battery cell is higher than the reference voltage level; and a resistive circuit, coupled to an output terminal of the comparing device, the resistive circuit arranged to generate an over-voltage detection signal when the driving current from the comparing device passes through the resistive circuit:

wherein the control unit is further coupled to the discharging circuit and arranged to determine whether to control the discharging circuit to couple to the at least one power output terminal according to the signal from the battery pack on one of the at least two connection terminals, wherein the signal from the battery pack on one of the at least two connection terminals indicates at least one of an over-voltage condition and an over-temperature condition, and wherein the signal from the battery pack indicating the over-voltage condition is supplied to a different one of the at least two connection terminals than the signal from the battery pack indicating the over-temperature condition, wherein the discharging circuit comprises a switch that is controlled by the control unit and a current source that is connected to a reference level, and when the discharging circuit is coupled to the at least one power output terminal through the switch, the discharging circuit provides a current path from the battery cell through the at least one power output terminal to the reference level.

7. The power system of claim 6, wherein one of the at least two connection terminals is coupled to a battery power contact of the battery pack and the charger circuit further comprises a voltage sensing circuit arranged to measure a voltage level on the battery power contact to generate an over-voltage detection signal, the control unit turns off the charge control switch and controls the discharging circuit to couple to the at least one power output terminal if the over-voltage detection signal indicates the over-voltage condition.

8. The power system of claim 6, wherein one of the at least two connection terminals of the charger circuit is coupled to a battery identification contact of the battery pack, and the resistive circuit comprises an identification resistor.

9. The power system of claim 6, wherein one of the at least two connection terminals of the charger circuit is coupled to a battery temperature contact of the battery pack, and the resistive circuit comprises a negative temperature coefficient thermistor.

10. The power system of claim 6, wherein one of the at least two connection terminals is coupled to a battery temperature contact of the battery pack, and the battery pack has a detection circuit that is arranged to generate an over-temperature detection signal at the battery temperature contact by detecting whether a temperature in the battery pack is higher than a predetermined reference voltage level, and the control unit turns off the charge control switch and controls the discharging circuit to couple to the at least one power output terminal if the over-temperature detection signal indicates the over-temperature condition.

11. The power system of claim 6, wherein the at least two connection terminals are arranged to function as a battery communication line (BCL) of Mobile Industry Processor Interface (MIPI) battery interface (BIF), and the charger circuit further comprises a BIF module, the control unit obtains information regarding a voltage level or a temperature of the battery cell from a BIF module of the battery pack, the control unit turns off the charge control switch and controls the discharging circuit to couple to the at least one power output terminal if the information from the BIF module of the battery pack indicates the over-voltage or the over-temperature condition;

wherein the BIF module of the charger circuit is coupled to the BIF module of the battery pack through a BCL.

* * * * *